United States Patent [19]

Kühl et al.

[11] 4,309,493
[45] Jan. 5, 1982

[54] CLOSURE FOR GALVANIC ELEMENTS

[75] Inventors: Thomas Kühl, Eppstein; Hans Sauer, Idstein-Walsdorf, Fed. Rep. of Germany

[73] Assignee: Varta Batterie Aktiengesellschaft, Hanover, Fed. Rep. of Germany

[21] Appl. No.: 175,828

[22] Filed: Aug. 8, 1980

[30] Foreign Application Priority Data

Oct. 16, 1979 [DE] Fed. Rep. of Germany ....... 2941757

[51] Int. Cl.³ ............................................. H01M 2/02
[52] U.S. Cl. .................................... 429/172; 429/174; 429/185
[58] Field of Search ............... 429/172, 173, 171, 174, 429/185, 175

[56] References Cited

U.S. PATENT DOCUMENTS

| | | | |
|---|---|---|---|
| 3,970,478 | 7/1976 | Jurva | 429/173 X |
| 3,970,479 | 7/1976 | King | 429/173 X |
| 4,146,681 | 3/1979 | Spanur | 429/172 X |

Primary Examiner—Charles F. Lefevour
Attorney, Agent, or Firm—Weiser, Stapler & Spivak

[57] ABSTRACT

A closure for a galvanic element, and particularly a cylindrical cell, is formed in substance of a cap-like or toroidal, resilient member, whose upstanding outer rim is segmented by slits into distinct flaps. These are therefore capable of acting resiliently in a radial direction and are capable of maintaining in the sealing region a steady sealing pressure between the cup and a plastic closure member. During closing of the cell through crimping, the flaps are supported from inside by a crimper support sleeve. In this way, the plastic of the closure body is plasticized during movement of the crimping tool toward the die.

9 Claims, 5 Drawing Figures

CLOSURE FOR GALVANIC ELEMENTS

The invention relates to a closure for a galvanic element, consisting of a closure body of insulating material, which is subject to being pressed against a sealing surface by means of a resilient member. The invention also relates to a method for making such a closure.

Most galvanic elements, including button cells, use a sealing structure made of a rotationally symmetrical cup-like housing into which a lid is inserted which is insulated and sealed by means of a plastic seal. By plastically deforming the cup housing against the lid, e.g. by crimping, a sealing force is produced. The lower modulus of elasticity of the sealing material insures that, even after elastic springing back of the cup following crimping, a compressive force remains in existence. The lid plays only a passive role in this interplay of forces in prior structures.

What is undesirable is that, with the passage of time, plastic material escapes from the compression forces due to cold flow. To this pressure reduction, which is called relaxation, there are added volume changes of the plastic which are attributable to structural transformations, e.g. change from amorphous to crystalline states.

In addition, large temperature differences may cause the plastic, due to its higher coefficient of expansion, to impart irreversible plastic deformations to the cup.

It is therefore of particular importance to absorb all expansion-modifying processes within the components of the seal in such elastic an manner that there does not occur any substantial reduction in the sealing pressure. A conventional cup and lid are not up to this task because they are closed in a circumferential direction and permit, in this circumferential direction, only an elastic diameter change of a few thousandths of a millimeter for a cylindrical cell of 10 mm diameter, for example.

From German Pat. (Patent schrift) No. 2,228,893 there is known a closure body of plastic material which covers the interior cross-section of the cell cup and in whose ridge-shaped, bowed edge region a ring of resilient material is inserted. The resilient ring is pre-tensioned and, because in its untensioned state it has a greater diameter than the ridge in the closure body which encircles it, this resilient ring exerts a steady pressure from inside against the wall of the ridge, which is thereby pressed against the inner surface of the cup in the region of the crimping zone.

This known closure construction has disadvantages which manifest themselves in that the pressure distribution around the circumference of the resilient ring is not uniform, in that elastic functioning of the ring can take place only with considerable friction in the circumferential direction, and in that the resilient element cannot be protected from plastic deformation from inside by an opposing force during crimping.

Accordingly, it is an object of the invention to provide a lid construction with a resilient element which avoids one or more of the disadvantages mentioned above, and which absorbs diameter changes elastically and without appreciable reduction in sealing force.

These and other objects which will appear are achieved in accordance with the invention by providing a resilient element which has the shape of an enveloping surface provided with slits in that region in which it presses the closure body against the sealing surface.

In accordance with the invention, temperature changes and relaxation processes in the plastic are elastically absorbed by the flaps of a semi-toroidal spring. The flaps extend from the resilient member through slits which are provided at right angles to the circumferential direction.

The resilient member embodying the invention, is so positioned with respect to the closure body that it maintains the compressive force in the sealing region between cell cup and closure body, or in the sealing region between closure body and a connector terminal which passes therethrough. Alternatively, it is so constructed that it acts upon both of these sealing regions.

In a preferred embodiment, the invention has a resilient member in the shape of a contact cap, whose outer rim is raised in toroidal form and is provided with slits.

In other embodiments, the resilient member has the shape of an open toroid, whose outer and/or inner enveloping surface is provided with slits.

In galvanic elements with alkaline electrolyte, a contact rod passes as electrical takeoff conductor—generally the negative takeoff conductor—centrally through the closure body and is welded to the contact cap which may, itself, be part of the resilient member.

Resilient members embodying the invention may be used for the most varied structural forms of cylindrical cells as well as for prismatic cells.

For further details reference is made to the discussion which follows in light of the accompanying drawings wherein.

Figure 3A:
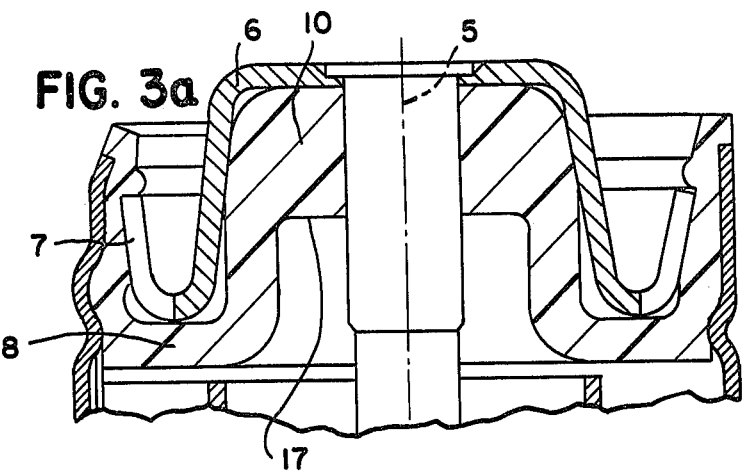
Figure 3B:
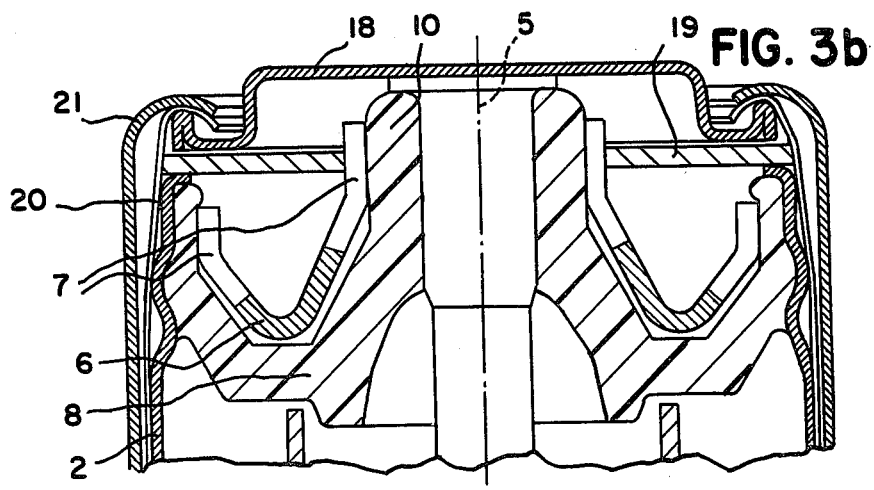
Figure 3C:
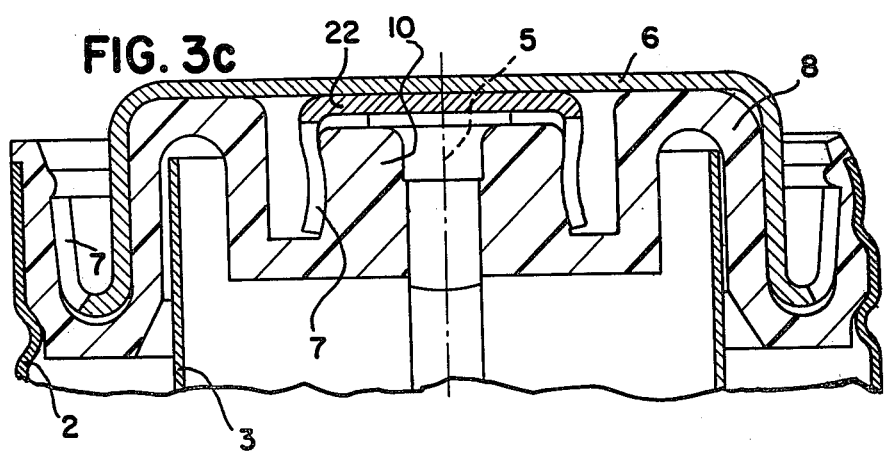

FIGS. 3a, 3b and 3c show partial elevations in cross-section of the sealing region of galvanic elements in which the resilient member takes the form, respectively, of an open toroid with slits in the outer enveloping surface, an open toroid with slits both in the inner and the outer enveloping surface, and two coaxially welded-together contact caps whose outer enveloping surfaces are provided with slits.

Figure 1:
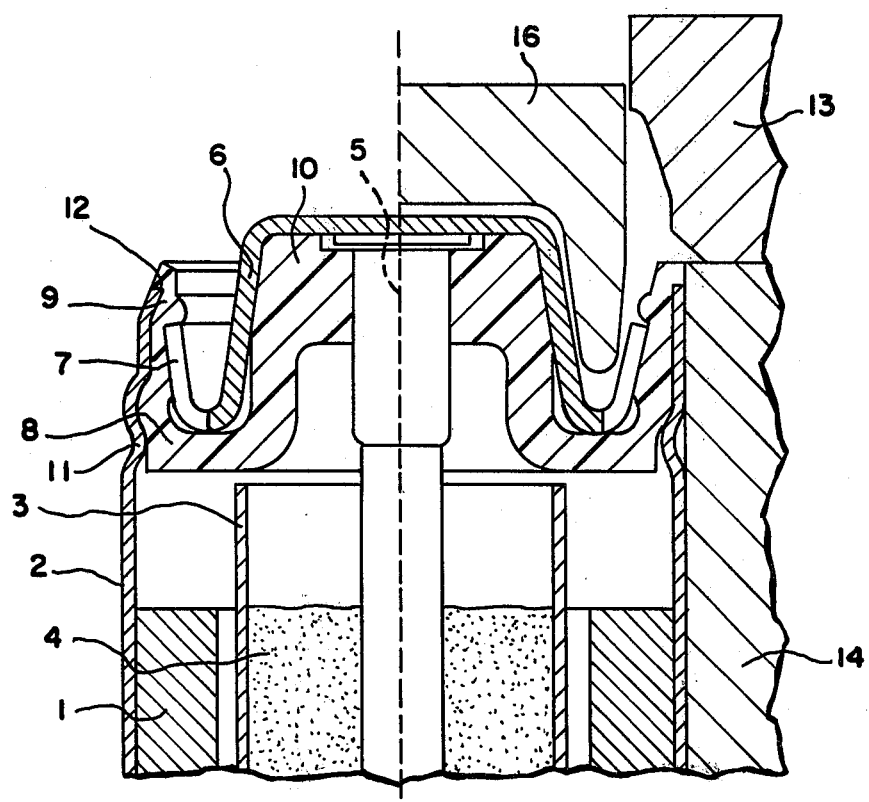
FIG. 1 illustrates the upper portion of a galvanic element with a contact cap which simultaneously serves as the resilient member.

The assembly of the galvanic element according to FIG. 1 begins with the insertion of cathode 1 into cup 2. There follows the insertion of the separator sleeve 3, the introduction of the anode material 4, e.g. zinc, and the dosing with electrolyte. Thereafter there are inserted into the closure body 8 outside the cell, in succession, the contact rod 5 and the resilient member 6 provided with slits 7 which takes the form of a contact cap. In so doing, a snap rim 9 determines the position of the resilient member 6 in closure body 8. After welding together the contact rod 5 and resilient member 6, which center themselves, the assembly of closure body 8, contact rod 5, and resilient member 6 is pushed into cup 2.

While the central portion of the closure body, which is designated as dome 10, is grasped by the inner envelope of the resilient member, the slits 11 in cup 2 and the upper rim 12 of the closure body provide fixed positioning.

Figure 2:
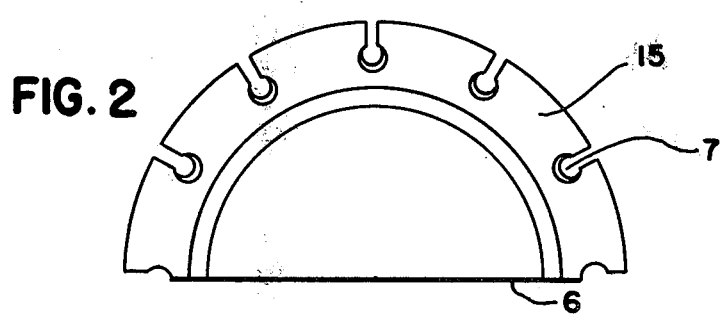
FIG. 2 shows a top view of the resilient member of FIG. 1.

In the right-hand portion of FIG. 1 there is diagrammatically shown the crimping tool for closing the galvanic element. While the crimping tool 13 moves down toward the die 14, the flaps 15 (see FIG. 2) of slitted resilient element 6 are held up from inside by the crimping support sleeve 16. This insures that, during crimping, the plastic of the closure body is plastified in the crimping region, that is, that it conforms optimally to the surface of both metal components (cup and spring). By so doing, plastic deformation of the resilient member during closure is reliably prevented.

Without the support sleeve, plastification of the closure body becomes more difficult because the spring must then be bent too strongly.

The resilient force is so proportioned in relation to the cup that the cup does not deform plastically following crimping due to the internal pressure which is created. Rather it is expanded only within its elastic limit.

The material of which the resilient member is made is generally a nickel plated steel, its thickness being about 0.5 mm.

In a further possible embodiment of the invention, illustrated in FIG. 3a, the resilient member 6, which is again a contact cap, exhibits a central aperture through which the contact rod 5 is introduced from above after preassembly of cap 6 and closure body 8. The frictional forces which are thus created can be relieved through the dome bottom 17 of the closure body 8 because these components are preassembled. The dome region 10 itself is prevented from escaping by the cap.

After final assembly, which takes place as explained with respect to FIG. 1, the contact rod 5 may be hermetically sealed into cap 6, e.g. by means of laser welding. Laser welding has the advantage of heating the cell only slightly.

Referring to FIG. 3b, the resilient member 6 can also take the form of an open toroid (semi-toroid). The open toroid is slitted on its outer periphery so that the resilient flaps which result are capable of resilient action in the radial direction. These resilient flaps on the outer periphery maintain the sealing pressure in the sealing region between cell cup 2 and closure body 8.

In addition, as shown, the toroidal spring 6 can also be provided at its inner enveloping surface with slits 7, so that the sealing pressure is maintained in the sealing region between contact rod 5 and closure body 8, i.e. at the dome of the cell. In any case the resilient flaps are subjected only to a bending force, without circumferential pressure being built up in the resilient member.

In this embodiment, also, the galvanic element is closed with the aid of a support sleeve 16. The negative take-off conductor, metallic contact rod 5, is inserted after it has been spot-welded to contact cap 18 and an insulating ring 19 has been added. Thereafter, shrink tubing 20 and a metal envelope 21 can be applied to the cell. Because internal slitting of a toroidal spring is difficult to accomplish in production, it may be replaced, as shown in FIG. 3c, by a second slitted resilient cap 22 with slits 7. This encircles the dome 10 (the sealing region between contact rod 5 and closure body 8) and puts it under pressure. In that case the closure body 8 must conform in its profile to both resilient members 6 and 22.

During assembly, contact rod 5 is first inserted into closure body 8, and then cap 22 is applied. Thereafter, contact rod 5 and cap 22 are welded together. The pre-constructed assembly of closure body 8, contact rod 5 and cap 22 is inserted into the large contact cap 6 and only then introduced into cup 2, centering being provided by separator sleeve 3. There then takes place the usual closure process, e.g. through crimping. In so doing, a support sleeve is used as explained with respect to FIG. 1 which prevents plastic deformation of the resilient member during closure. Such a support sleeve can also be used during assembly of contact rod 5, closure body 8 and cap 22. Thereafter, cap 22 is welded to contact cap 6.

We claim:

1. A closure arrangement for a galvanic element which includes a closure body of insulating material which is adapted to be pressed against a sealing surface by means of a resilient member wherein
   the resilient member takes the form of an enveloping surface which is provided with slits in the region in which it presses against the closure body,
   the portions of the member between the slits being free to move in a direction away from the closure body.

2. The closure arrangement of claim 1 wherein the slits are positioned at right angles to the circumferential direction.

3. The closure arrangement of claim 1 wherein the resilient member takes the form of a contact cap whose outer rim extends upwardly in toroidal form and is provided with slits.

4. The closure arrangement of claim 1 wherein the resilient member takes the form of an open toroid whose inner or outer enveloping surfaces or both are provided with slits.

5. The closure arrangement of claim 1 wherein a contact rod extends centrally through the resilient member as the electrical take-off conductor.

6. The method of producing of a closure arrangement of a galvanic element in accordance with claim 1 comprising the step of establishing the position and shape of the resilient member so that its enveloping surface lies against the sealing material of the closure body during closing of the closure arrangement.

7. The method of claim 6 further comprising inserting through the resilient member a contact rod which takes the form of a contact cap and joining said rod and member by laser welding.

8. The closure arrangement of claim 1, wherein the resilient member is of generally circular, plate-like configuration and has an annular trough defined in its peripheral region, the slits being located in the outer wall of the trough.

9. A closure arrangement for a galvanic element having a cylindrical cup and a cap for the open end of the cup, the closure arrangement including a closure body of insulating material positioned within and adjacent to the open end of the cup, the cap comprising a resilient member which takes the form of an enveloping surface pressing against the interior of the closure body and provided with slits, whereby the portions of the resilient member between the slits press the closure body against the adjacent portion of the cup.

* * * * *